July 31, 1934.  A. E. PETZEL  1,968,503
FRUIT WASHING MACHINE
Filed Dec. 21, 1931   3 Sheets-Sheet 1
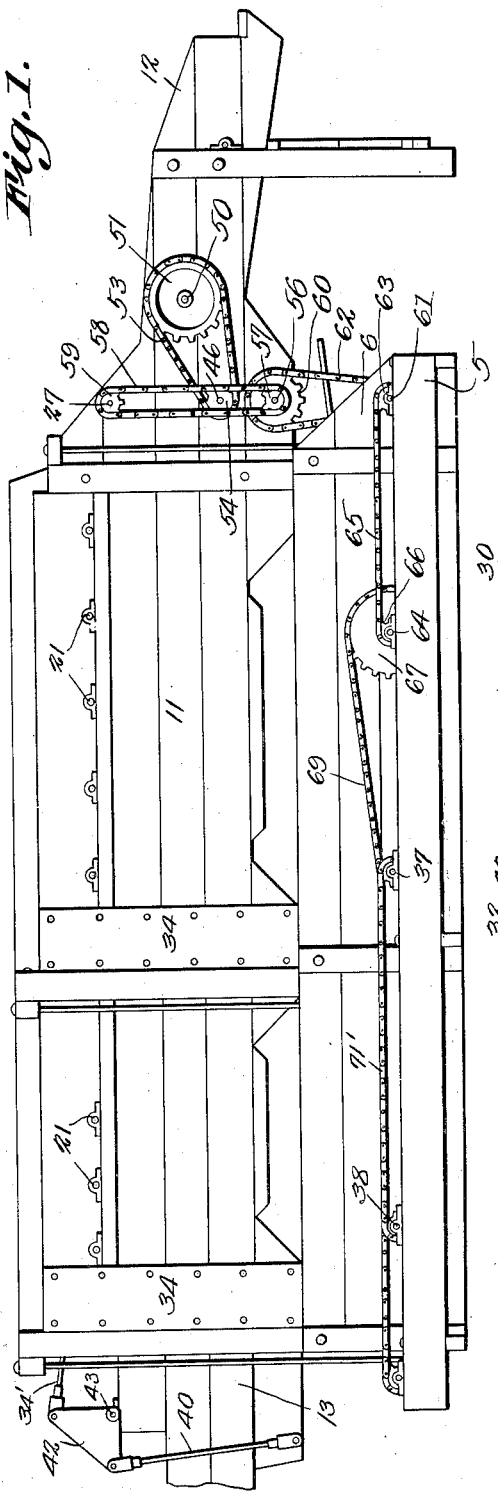
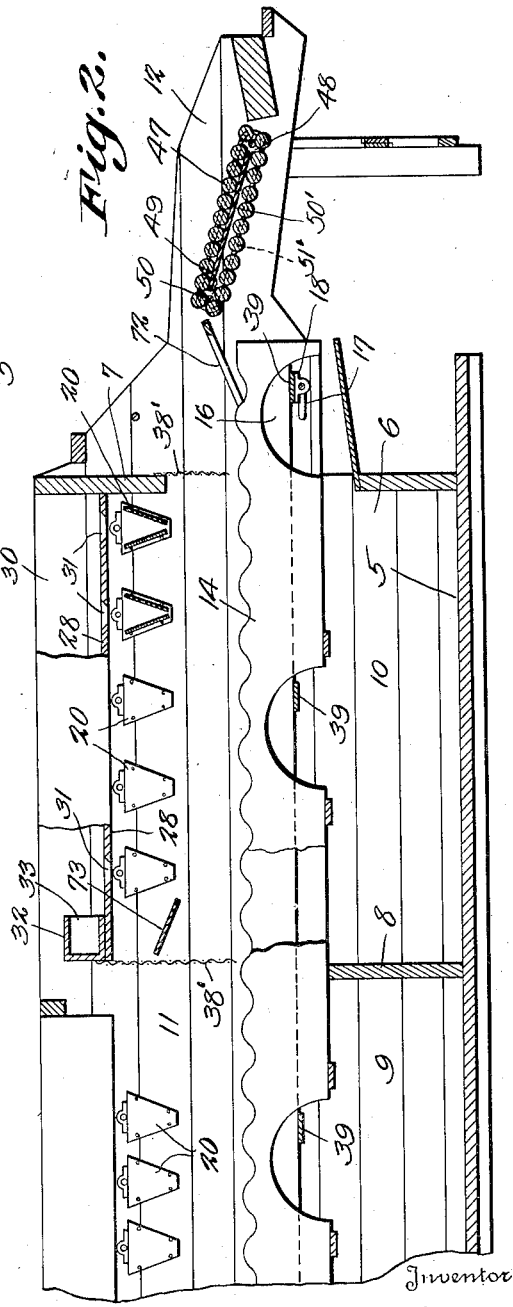
Inventor
A. E. Petzel
By C. A. Snow & Co.
Attorneys.

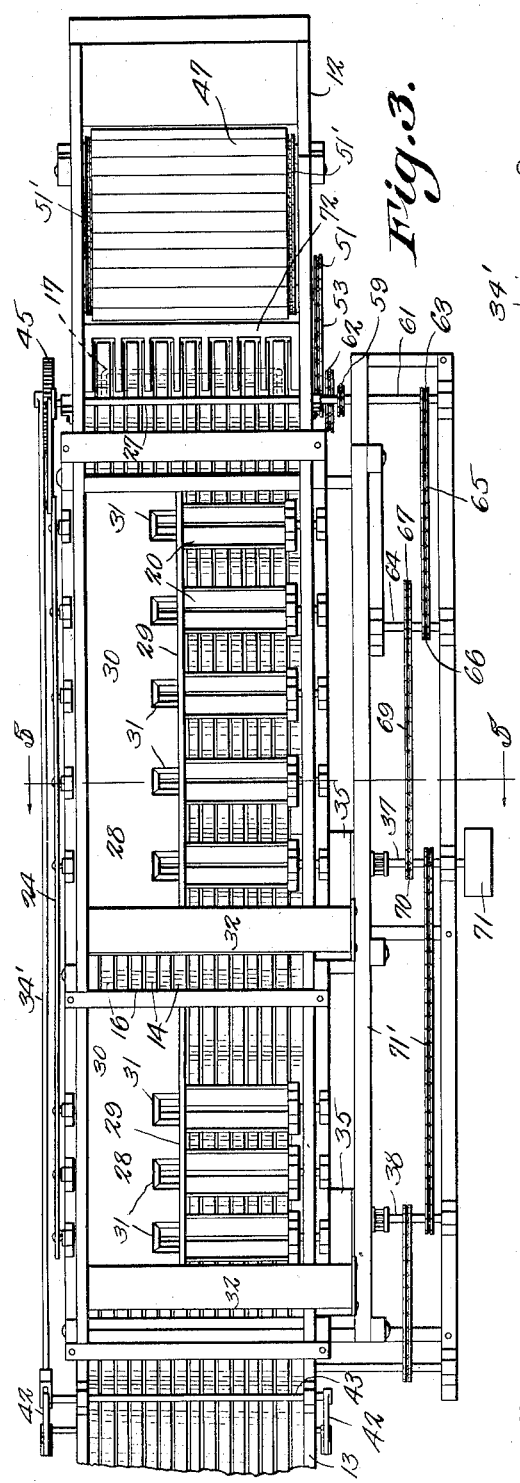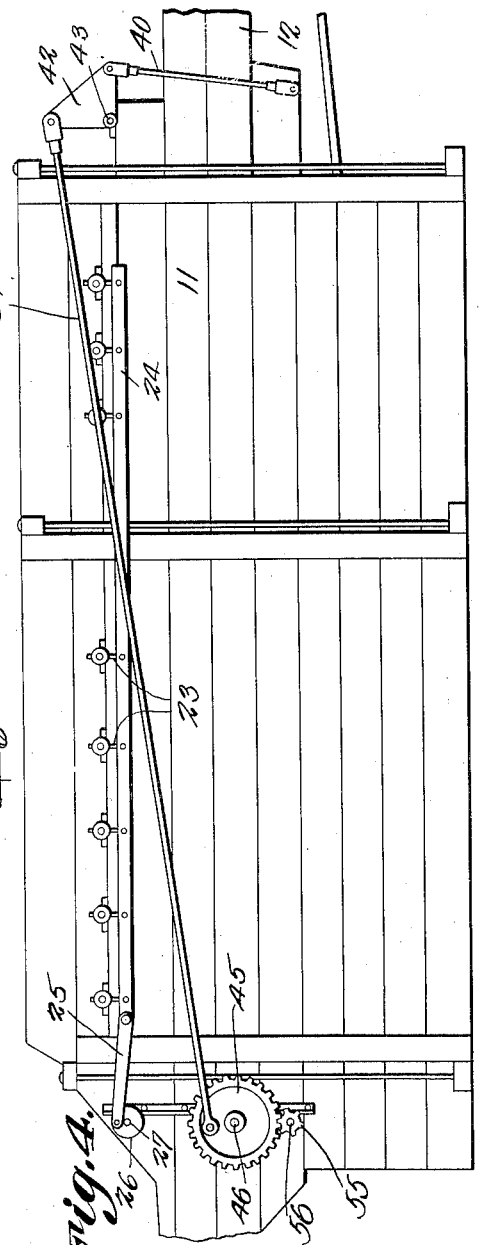

July 31, 1934.  A. E. PETZEL  1,968,503
FRUIT WASHING MACHINE
Filed Dec. 21, 1931   3 Sheets-Sheet 3
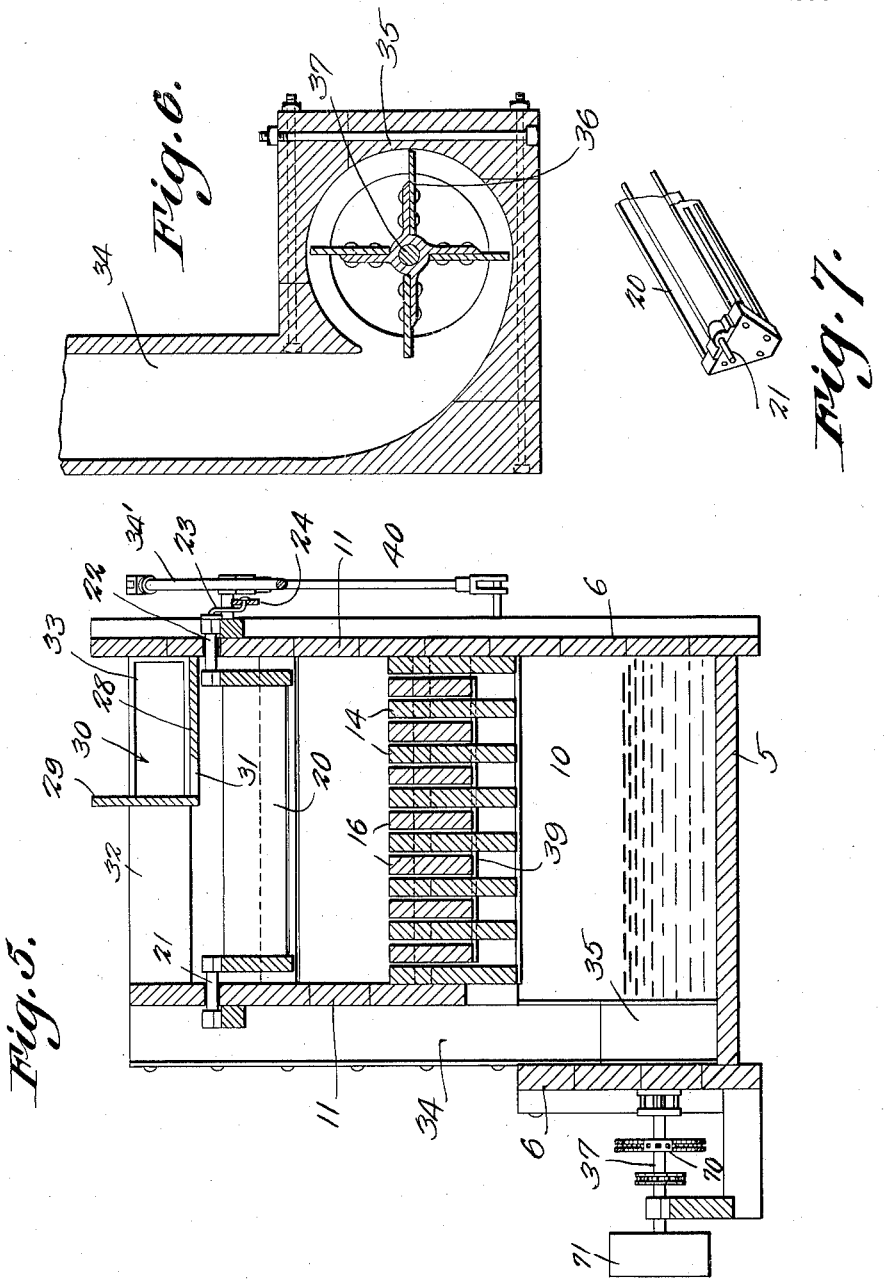
Inventor
A. E. Petzel
By C. A. Snow & Co.
Attorneys.

Patented July 31, 1934

1,968,503

UNITED STATES PATENT OFFICE 1,968,503

FRUIT WASHING MACHINE

Arthur E. Petzel, Yakima, Wash.

Application December 21, 1931, Serial No. 582,386

2 Claims. (Cl. 146—194)

This invention relates to a machine designed for treating and washing fruit such as apples, or the like, the primary object of the invention being to provide a machine of this character wherein the fruit may be fed into one end of the machine and treated, the treated fruit passing from the opposite end of the machine in a clean condition.

An important object of the invention is to provide a machine of this character including a plurality of troughs, the troughs being so constructed that they receive the water or fruit treating liquid, and spray the liquid over the fruit in such a way that the fruit will be thoroughly treated with the liquid and all foreign matter removed therefrom.

Another important object of the invention is to provide a machine of this character wherein the water or fruit treating liquid is returned to the tanks after it has been sprayed over the fruit to treat the fruit.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a machine constructed in accordance with the invention.

Figure 2 is a fragmental sectional view.

Figure 3 is a plan view of the machine.

Figure 4 is a fragmental elevational view illustrating the rear side of the machine.

Figure 5 is a sectional view taken on line 5—5 of Figure 3.

Figure 6 is a sectional view through the pump used for pumping the fruit treating liquid from the tanks, to the troughs.

Figure 7 is a fragmental perspective view of one of the spraying troughs.

Referring to the drawings in detail, the machine comprises a base indicated generally by the reference character 5.

Side members 6 extend from the base, which side members are connected at their ends by means of the end members 7, the side and end members constituting a tank, at the lower part of the machine. The tank is divided by means of the partition 8, providing lateral tanks 9 and 10 respectively, the tank 10 being larger than the tank 9, for purposes to be hereinafter more fully described.

A frame is supported above the tank and includes the side members 11 that have their ends extended beyond the ends of the tank, the end 12 constituting the front end of the machine, while the end 13 constitutes the delivery end thereof.

The main conveyor is supported within the body portion of the machine, and comprises stationary horizontal bars 14 and movable bars 16 operating between the bars 14 to feed the fruit under treatment, towards the delivery end of the machine.

As shown, the upper edges of the bars are scalloped or irregularly formed defining recesses in which the fruit is held as it is being fed through the machine and treated. The bars 16 are connected by the transversely disposed bars 39 so that they move in unison, and have their forward ends mounted on the crank shaft 17, which shaft operates in bearings 18 carried by the bar 39 which is disposed at the forward end of the machine.

Connected with the outermost bars 16 at the opposite ends thereof, are connecting links 40 that have their upper ends connected with the plates 42 which are secured to the shaft 43 to move therewith.

An operating rod 34' has connection with the plate 42 at one side of the machine and has eccentric connection with the gear 45 mounted on the shaft 46 that extends across one end of the machine.

It will of course be understood that the operation of the rod 34' is timed with the movements of the crank shaft 17, so that the bars 16 will be moved forwardly and upwardly, to feed the fruit through the machine.

Supported directly above the conveyor, are a plurality of pivoted troughs 20 that are arranged in parallel spaced relation with each other, the side plates of the troughs being inclined and the lower edges thereof spaced apart so that liquid deposited in the troughs, may pass from the troughs in a fine spray.

These troughs are mounted on the shafts 21 and 22 respectively, disposed at opposite ends of the troughs, the shafts 22 being formed with crank arms 23 that are connected with the operating bar 24, which in turn has pivotal connection with the pitman 25, which pitman is eccentrically connected with the disk 26, mounted on one end of the shaft 27, with the result that when the shaft 27 is rotated, the operating bar 24 is reciprocated, rocking the troughs and causing the troughs to direct liquid to the fruit which is being rolled towards the delivery end of the machine, by the conveyor.

These troughs are supported directly under the horizontal partitions 28, which are formed with upstanding inner walls 29 defining tanks 30 at the upper part of the machine.

The partitions 28 are formed with openings 31 to allow liquid to pass from the tanks, into the troughs, the troughs being disposed directly under the openings 31.

Horizontal passageways 32 are supported within the upper part of the tanks 9 and 10, and have communication with the tanks 30, through the openings 33, the horizontal passageways being in communication with the vertical passageways 34, so that liquid forced upwardly through the passageways 34 will be directed laterally into the horizontal passageways 32, where it will find its way into the tanks.

At the lower ends of the passageways 34 are pump housings 35 in which the rotary pumps 36 are mounted, the housings 35 having lateral openings, to permit the liquid to be drawn into the pump housings and forced upwardly into the vertical passageways 34, by the pumps.

Shafts 37 and 38 respectively extend into the pump housings and provide supports for the pumps 36. These shafts extend beyond the sides of the machine, and are provided with sprockets.

Aprons 38' are supported within the machine, and hang downwardly so that the lower edges thereof lie in close proximity to the bars 14 and 16 that constitute the main conveyor of the machine, so that the liquid will be confined to its tank, and will not splash into the tank containing clear water.

Mounted at the forward end of the machine, is an endless conveyor 47 that operates over the table 50' and sprockets 48 and 49, the sprocket 49 being mounted on the shaft 50 that is mounted in bearings formed at the forward end of the machine.

A sprocket indicated at 51 is mounted on the shaft 50, and receives motion from the shaft 46, through the chain 53 which operates over the sprockets 51 and 54, the latter sprocket being mounted on the shaft 46, as clearly shown by the drawings.

The endless conveyor 47 is made up of a plurality of rollers supported on the chains 51', that moves over the sprockets 48 and 49, mounted on the shafts 50.

The gear 45 which is secured to one end of the shaft 46, is rotated by means of the gear 55, mounted on one end of the shaft 56, which shaft 56 carries a sprocket 57 over which the chain 58 operates, the chain 58 also operating over the sprocket 59 mounted on the shaft 27. Sprocket 60 is mounted on the shaft 56 and receives motion from the shaft 61, through the chain 62 which also operates over a smaller sprocket also mounted on shaft 61.

Sprocket 63 which is mounted on the shaft 61 near the outer end thereof, receives motion from the shaft 64, through the chain 65 that operates over a sprocket 66, which is secured to the shaft 64.

A relatively large sprocket indicated at 67 is mounted on the shaft 64, and receives motion from the power shaft 37, through the chain 69 and sprocket 70, the sprocket 70 being secured to the shaft 37.

A power pulley indicated at 71 is mounted on one end of the shaft 37, and accommodates a suitable power belt not shown through which rotary motion is directed to the power shaft 37.

Rotary movement is transmitted to the shaft 38, through the chain 71' which operates over sprockets mounted on the shafts 37 and 38, as clearly shown by Figure 3 of the drawings. Disposed between the endless conveyor 47 and the main conveyor of the machine, are inclined slats 72 onto which the fruit passes from the endless conveyor, which slats direct the fruit onto the main conveyor of the machine.

It might be further stated that within the tank 10, is a baffle plate 73 that deflects the liquid downwardly onto the main conveyor, and prevents the liquid from splashing onto the tank 9.

The operation of the machine is as follows: The machine is set in motion and the fruit to be treated is fed onto the endless conveyor 47, which moves the fruit forwardly onto the main conveyor. The main conveyor moves the fruit forwardly in a step by step motion, slightly rotating the fruit as the fruit is passed under the pivoted troughs that are arranged in the tank 10.

The fruit is treated by the liquid which is sprayed from the pivoted troughs operating within the tank 10, and passes into the upper portion of the tank 9, where the fruit is subjected to a cleansing liquid such as water, which washes the treating liquid from the fruit.

It follows that the fruit is now directed to suitable containers positioned at the discharge end of the machine.

Having thus described the invention what is claimed is:

1. A fruit treating machine comprising a body portion, means for moving fruit to be treated through the body portion, a plurality of pivoted troughs having open bottoms through which liquid passes, mounted above the fruit moving means, shafts on which the troughs are mounted, crank arms secured at the ends of the shafts, a bar to which the crank arms are connected, means for reciprocating the bar whereby the troughs are oscillated distributing liquid over the fruit, and means for supplying liquid to the troughs.

2. A fruit treating machine comprising a body portion, means for moving fruit to be treated through the body portion, a plurality of shafts extending across the body portion, troughs secured to the shafts and depending therefrom, the bottoms of the troughs being open throughout their entire lengths permitting liquid to pass from the troughs in a fine film, where the liquid is directed to the fruit, and means for rocking the troughs for distributing the liquid.

ARTHUR E. PETZEL.